United States Patent

[11] 3,573,582

[72] Inventor Edward A. Petrocelli
San Diego, Calif.
[21] Appl. No. 808,735
[22] Filed Mar. 20, 1969
[45] Patented Apr. 6, 1971
[73] Assignee The United States of America as represented by the Secretary of the Navy

[54] LARGE DC MOTOR CONTROL CIRCUIT
10 Claims, 1 Drawing Fig.
[52] U.S. Cl. .................................................. 318/305, 318/411, 318/442
[51] Int. Cl. ........................................................ H02p 1/28, H02p 7/14
[50] Field of Search .......................................... 318/305, 306, 307, 248, 400, 411, 416, 338

[56] References Cited
UNITED STATES PATENTS

| | | | |
|---|---|---|---|
| 3,280,397 | 10/1966 | Bruns | 318/338 |
| 3,309,597 | 3/1967 | Gabor | 318/400 |
| 3,345,547 | 10/1967 | Dunne | 318/400 |
| 3,359,477 | 12/1967 | Wasal | 318/416 |
| 3,384,758 | 5/1968 | Kelley | 318/343 |

*Primary Examiner*—Oris L. Rader
*Assistant Examiner*—Thomas Langer
*Attorneys*—Joseph C. Warfield, John W. Pease and John F. Miller ABSTRACT: A motor control apparatus for starting, stopping, and regulating the speed of large electric motors.

Patented April 6, 1971
3,573,582
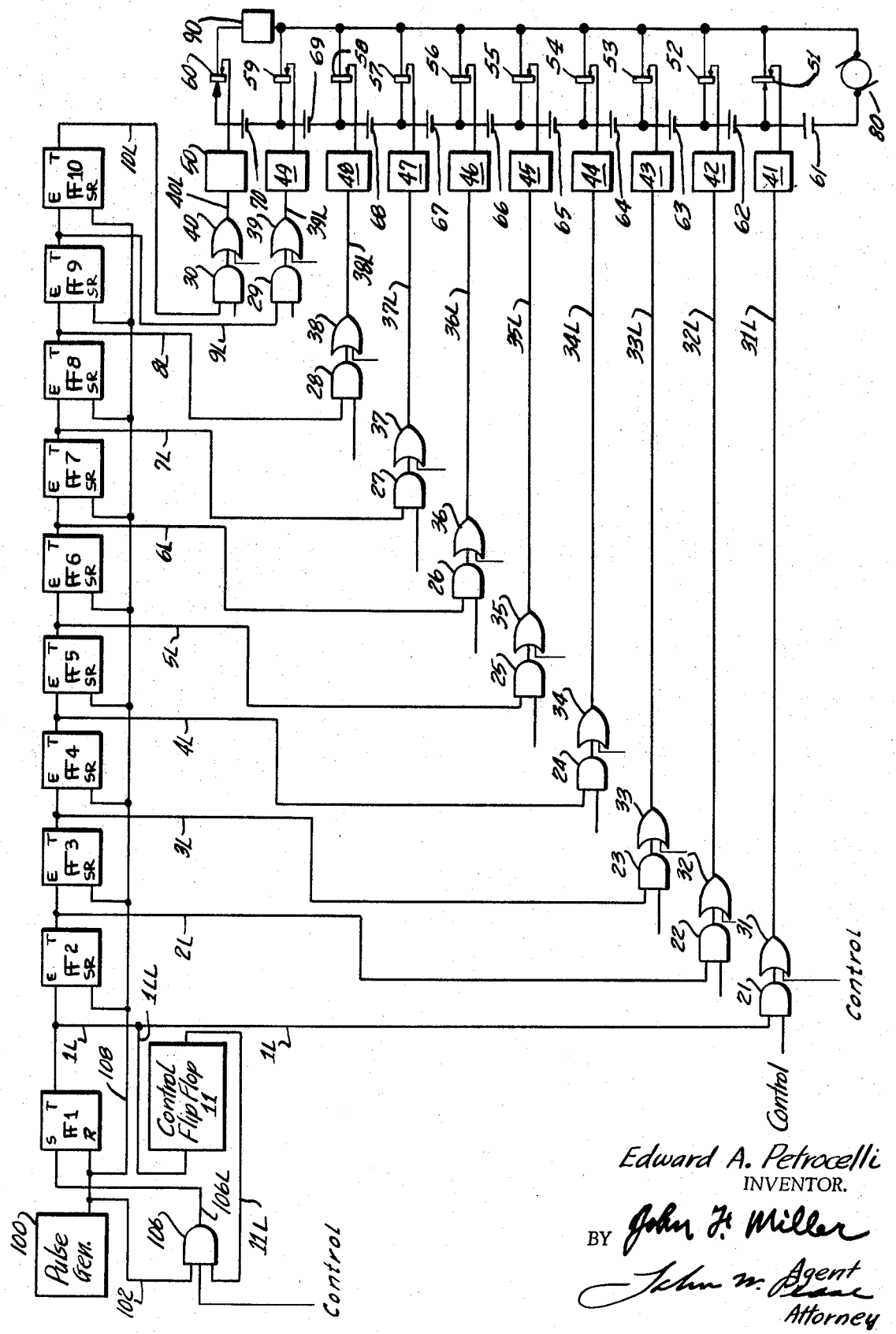
Edward A. Petrocelli
INVENTOR.
BY John F. Miller
John W. Pease
Attorney

LARGE DC MOTOR CONTROL CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of motor control circuits. Heretofore various devices have been utilized for starting up and regulating the speed of large electric motors. The inertia of the rotating elements and the lack of back electromotive force at low speed are such that some means of controlling the starting current is necessary to avoid damage. Prior art controllers have suffered from excessive complexity, cost and fragility. The invention solves this problem of the prior art by providing a rugged, simple, and inexpensive solid state circuit capable of infinite adjustment to conform to the control requirements of large DC motors.

SUMMARY OF THE INVENTION

A counting chain is driven by a pulse source to control a plurality of gating means which are respectively associated with the several stages of the chain. The gating means sequentially operate selected ones of a plurality of silicon controlled rectifiers to apply selected voltages sequentially to a DC motor so as to provide any required delays in the application of successively higher starting currents.

BRIEF DESCRIPTION OF THE DRAWING

The drawing is a block diagram of the apparatus.

DESCRIPTION OF THE PREFERRED EMBODIMENT

Referring now to the drawing, a pulse generator 100 generates a train of pulses at a selected frequency. These pulses are supplied over a lead 102 to a three input AND gate 106 and over a lead 108 to respective set-reset inputs of flip-flops 2—10 and to the reset input of flip-flop 1. The flip-flops 1—10 are connected in a chain to form a counter by the unlabeled leads which connect the output terminal T of each flip-flop except the last one to an enabling input E of a succeeding flip-flop. For example, the output terminal T of flip-flop 1 is connected to the enabling terminal E of flip-flop 2, the output of 2 is connected to the enabling input of flip-flop 3, etc. Flip-flops 2—10 are so constructed that when they are in a reset condition they will be set by a pulse on the set-reset (SR) input terminal only if there is a voltage present on the enabling input terminal E from a preceding flip-flop in a set condition. When one of the flip-flops 2—10 is in a set condition, it will be reset by a pulse on the SR input if there is no enabling voltage present. Flip-flop 1 and a control flip-flop 11 are designed to be set and reset by a pulse on their respective set and reset input terminals. All of the flip-flops and other elements to be described hereinafter may be reset to a selected condition by a signal applied by conventional reset means (not shown) as is well known in the art.

The output terminal T of flip-flop 1 is also connected over a lead 1L to one input of a two input AND gate 21 and over a lead 1LL to the set input of control flip-flop 11. Flip-flop 11 when reset furnishes an output signal over a lead 11L to one input of three input AND gate 106. The output terminal T of flip-flop 2 also furnishes a signal over a lead 2L to one input of a two input AND gate 22. In a like manner flip-flops 3—10 furnish signals over leads 3L—10L to respective inputs of AND gates 23—30. The respective outputs of AND gates 21—30 are connected to an input of respective two input OR gates 31—40. AND gates 21—30 and OR gates 31—40 each have a second input lead labeled "control" whereby a control signal may be applied. The outputs of OR gates 31—40 are connected over respective leads 31L—40L to the respective inputs of silicon controlled rectifier (SCR) drivers 41—50. Each driver 41—50 is connected to drive a respective silicon controlled rectifier (SCR) 51—60 to conduct current. A chain of suitable power sources shown, by way of example, as batteries 61—70 are connected in series between one side of a large DC motor 80 and the anode of SCR 60. Leads are connected from the respective lines between two successive batteries in the series connected chain to a respective anode of each of the SCR's 51—59. For example, the anode of SCR 51 is connected to the line connecting batteries 61 and 62, SCR 52 is connected to the line connecting batteries 62 and 63, etc. Therefore 24 v. are applied to SCR 51, since battery 61 is a 24 v. battery, 36 v. (the combined voltages of 24 v. battery 61 and 12 v. battery 62) are applied to SCR 52, 48 v. are applied to SCR 53, etc. Battery 61 is a 24 v. battery and all the other batteries, 62—70, are 12 v. batteries.

Motor 80 may be operated at a number of different speeds, the number being determined by the number of SCR's and associated circuits in the apparatus. To start motor 80, a signal from control means (not shown) is applied to the control leads of three input AND gate 106, to that one of AND gates 21—30 associated with the desired speed, and to all lower numbered AND gates. For example, if it is desired to operate motor 80 at its fourth speed a signal would be applied to three input AND gate 106, and to two input AND gates 24, 23, 22, and 21. Since control flip-flop 11 is in a reset condition, it provides a signal over line 11L to the lower input of AND gate 106. Therefore, when pulse generator 100 next forwards a pulse to the upper input of 106, a signal is forwarded from 106 to the set terminals S of flip-flop 1.

Flip-flop 1 is so arranged and the timing of the pulses is such that the signal to the set input prevails over the signal from pulse generator 100 on line 108 applied to the reset input. Control flip-flop 11 is set by an output signal from flip-flop 1 over lines 1L and 1LL when flip-flop 1 is set. This removes the output signal from the control flip-flop 11 furnished over line 11L to the lower input of three input AND gate 106, thereby blocking gate 106 so that no additional pulses from pulse generator 100 are passed to the set input of flip-flop 1. Flip-flop 2 is enabled by the steady state output of flip-flop 1 when flip-flop 1 is set, so flip-flop 2 will be set by the next pulse from pulse generator 100 on line 108. The output of flip-flop 1 in a set condition is also applied to one input of two input AND gate 21. Since a control voltage has been applied to the other input of 21, an output signal from gate 21 is applied through OR gate 31 to SCR driver 41 via line 31L. SCR driver 41 furnishes a signal to bias SCR 51 to conduct so that SCR 51 passes current from 24 v. battery 61 through motor 80. Therefore motor 80 starts and increases its speed until it reaches its first speed. The speed is determined by the 24 v. applied from 61 and the motor characteristics. About the time that motor 80 attains its first speed, pulse generator 100 applies another output pulse to the set inputs of all the flip-flops 1—10 over line 108. This has no effect on any of the flip-flops except flip-flop 1 which is reset and flip-flop 2 which is set due to the enabling voltage present on the output of flip-flop 1. This removes the output voltage from flip-flop 1 on line 1L so that AND gate 21 is blocked. The output voltage of flip-flop 2 enables flip-flop 3 to be set by the succeeding pulse on line 108 from pulse generator 100. The output of flip-flop 2 is applied over line 2L to open AND gate 22 which has a signal voltage applied thereto on the control input so that a signal is passed through OR gate 32 to SCR driver 42 over line 32L to bias SCR 52 to conduct current from series connected batteries 61 and 62 through motor 80. Motor 80 therefore increases its speed to step No. 2, determined by the applied 36 v. This voltage back biases SCR 51 to cease conduction thus blocking this current path through SCR 51. In a similar manner, a third pulse from pulse generator 100 over line 108 will reset flip-flop 2 and set flip-flop 3 which will apply a voltage over line 3L to AND gate 23 so that SCR 53 is opened for passage of current from series connected batteries 61, 62, and 63 so that motor 80 accelerates to its third speed. The 48 v. from series connected batteries 61, 62, and 63 back biases SCR 52 to cease conduction thereby blocking the current path through SCR 52. When flip-flop 4 is set, SCR 54 opens to apply the 60 v. from series connected batteries 61—64 to motor 80 so that the motor's fourth speed is attained. The pulses from 100 are spaced at intervals of time sufficient for motor 80 to attain the next higher speed.

Since pulse generator 100 runs continuously the chain comprised of flip-flops 1—10 will continue to step, applying flip-flop output voltages successively to AND gates 25—30 over lines 5L—10L in the manner described. However, motor 80 does not increase its speed above the fourth speed because no signal voltages are applied to the control inputs of AND gates 25—30.

When flip-flop chain flip-flop 1—10 counts out so that all the flip-flops 1—10 are reset (control flip-flop 11 remains set), the pulses from pulse generator 100 on line 108 have no further effect. The system will remain in this condition until reset by applying a reset signal. This may be done by well-known means, e.g., a manual switch (not shown).

Assuming that motor 80 is running at fourth speed, its speed may be increased by applying signal voltages to higher numbered AND gates including the gate associated with the desired speed and those gates between the present speed and the desired speed, and to the three input AND gate 106. For example, with motor 80 operating at its fourth speed if it were desired to increase the speed to the eighth step, a signal voltage would be applied to the control inputs of AND gates 25, 26, 27, 28, and 106.

If motor 80 is running at a particular speed, say the eighth, and it is desired to decrease the speed, for example, to the second speed, a signal voltage is applied to the two input AND gates associated with all the remaining higher speeds and to the OR gate associated with the desired lower speed and to three input AND gate 106. In the recited example these would be AND gates 29, 30, OR gate 32, and three input AND gate 106. Then motor 80 will increase speed through the ninth and 10th speeds and then drop to the second speed because of the presence of a signal voltage on OR gate 32.

If it is now desired to stop motor 80, the signal voltage is removed from OR gate 32 and is applied to all the two input AND gates 21—30 and to three input AND gate 106. Thereupon motor 80 will accelerate from the second speed through the successive speeds including the 10th speed and automatically cut off.

SCRs 51—59 are selected so as to be back biased to stop conducting when the next higher SCR in the chain opens to apply a higher voltage to motor 80 and to all lower numbered SCRs. Since there is no higher numbered SCR to stop conduction in SCR 60, a turn off circuit 90 is provided to turn SCR 60 off after 60 has been conducting for a length of time sufficient for motor 80 to accelerate from the ninth to the 10th speed.

The components shown in the drawing are all well known in the art and will not be described in detail. The particular pulse generator, gates, flip-flops, etc. are chosen to serve the particular application. Flip-flops may be selected with switching times suitable for a particular motor. A single flip-flop of the chain 1—10 is shown located between the leads to successive two input AND gates by way of example only. This merely illustrates that a delay occurs between switching on a higher voltage to increase the speed of motor 80. The invention contemplates the use of flip-flops with various switching times and/or a plurality of flip-flops in a chain between a pair of adjacent AND gate leads in order to tailor the invention to the requirements of a particular motor. For example, if more delay were required between one or more steps, two or more flip-flops could be connected between two AND gate inputs so that two or more pulses from 106 would be counted before motor 80 was switched to a higher speed. SCR turn off circuit 90 may be any circuit which will back bias SCR 60 to cut off after a suitable delay. For example, circuit 90 can comprise a suitable capacitor and a resistor connected in parallel in the cathode circuit of SCR 60. When SCR 60 conducts, a voltage will build up on the capacitor which after some delay is sufficient to cut off the SCR. The capacitor may be discharged by a suitable transistor or other switch means connected across the capacitor. This may be actuated to discharge the capacitor by the conventional reset means employed to reset the flip-flops of the invention, if desired. SCR's 51—60 are selected to match the voltage sources to which they are respectively connected. The term flip-flop is employed for convenience of description, but is not limited to a conventional bistable multivibrator. It is intended to include any suitable two-state device, particularly in the counting chain, where a single tube, transistor, or equivalent two-state device may suffice for a stage.

I claim:

1. In a motor control circuit, the improvement comprising: a motor, a plurality of voltage sources connected to provide a plurality of successively higher voltages, a plurality of selectively actuated switch means arranged to selectively connect respective ones of said voltage sources to said motor in a selected sequence, a plurality of driver means for driving said switch means, a cascaded chain of two state devices, pulse generator means arranged to supply a train of pulses to said cascaded chain of two state devices to sequentially switch said two state devices, a plurality of gating means, and means connecting said cascaded chain of two state devices, said plurality of gating means, said driver means, and said switch means whereby said two state devices control the actuation of said switch means to connect said voltage sources to said motor in a selected sequence.

2. The apparatus of claim 1 wherein said gating means are provided with control leads whereby control signals may be applied to selected ones of said gating means to thereby determine said selected sequence.

3. The apparatus of claim 2 wherein said gating means comprise a plurality of two input AND gates and a like plurality of OR gates, each of said two input AND gates having an output connection to the input of a respective one of said OR gates.

4. The apparatus of claim 3 wherein said control leads comprise a plurality of control leads with a control lead connected to the input of each respective one of said AND gates whereby selected ones of said AND gates may be enabled to pass a signal from a respective one of said two state devices to the input of a respective one of said OR gates, and whereby selected ones of said OR gates may be selectively enabled by a control signal applied to its control lead.

5. The apparatus of claim 4 and including control means for controlling the supply of said train of pulses from said pulse generator means to said cascaded chain of two state devices.

6. The apparatus of claim 5 wherein said control means comprise a three input AND gate, and a control flip-flop, one input of said three input AND gate being connected to the output of said pulse generator means, a second input of said three input AND gate being connected to the output of said control flip-flop, the third input of said three input AND gate being adapted to receive a control signal, the output of said three input AND gate being connected to the set input of said first of said two state devices, whereby when a control signal is applied to said three input AND gate said gate is enabled to pass a pulse from said pulse generator means to set said first two state device.

7. The apparatus of claim 6 and including means connecting the output of said first one of said two state devices to the set input of said control flip-flop to set said control flip-flop and thereby remove the output voltage of said control flip-flop from said second input of said three input AND gate to thereby close said three input AND gate to the passage of pulses from said pulse generator means.

8. The apparatus of claim 7 wherein the output of each of said two state devices is connected to an enabling input of the next succeeding two state device to enable said succeeding two state device to be set by a pulse on its set-reset input from said pulse generator means.

9. The apparatus of claim 8 wherein said connecting means comprise a connection from the output of each of said two state devices to one input of a respective one of said two input AND gates.

10. The apparatus of claim 9 wherein said switch means are silicon controlled rectifiers, means connecting said rectifiers whereby a rectifier actuated to connect a voltage source to said motor is deactuated when a rectifier connecting a higher voltage source to said motor is actuated.